March 1, 1938. H. J. HIRSCHENFELD 2,109,796
BARBECUE FURNACE
Filed March 10, 1937

Henry J. Hirschenfeld
Inventor
By Philip A. Friedell
Attorney

Patented Mar. 1, 1938

2,109,796

UNITED STATES PATENT OFFICE 2,109,796

BARBECUE FURNACE

Henry J. Hirschenfeld, Oakland, Calif.

Application March 10, 1937, Serial No. 130,085

10 Claims. (Cl. 99—259)

This invention, a barbecue furnace, is an improvement over the usual types of barbecue pits and methods of barbecuing, and is specially directed to the barbecuing, or cooking by the direct heat of a wood fire in the presence of the smoke issuing from the fire, portions of meat, such as spare-ribs, chops, steaks, and roasts.

The improvement consists in the specific construction of the furnace, in which a blanket of smoke is kept in continuous and completely enveloping contact with the meat being barbecued or cooked to provide an unusually rich smoky flavor to the meat.

In the usual process of barbecuing, the meat is exposed to the direct heat of the fire, and the smoke partly passes about the meat, the majority escaping through passages remote from the meat, whereby but little actual smoky flavor is imparted to the meat.

The improvement also consists in the provision of means for applying special solutions to the meat following each turning or inversion of the meat, for the specific purpose of sealing the juices in the meat and coincidently seasoning the meat.

The main object of the invention is to provide a barbecue furnace with a fully enclosed smoke hood over the meat-support grates or grids, and to construct the furnace in such manner that smoke is maintained in direct, completely-enveloping contact with the meat throughout the cooking period.

Another object of the invention is to provide means for spraying with, or applying to, the meat at intervals during the barbecuing period, a special sealing and seasoning composition, which will seal the juices in the meat and coincidently season the meat.

A further object is to provide a warming oven for keeping the meat hot without cooking after the barbecue operation is completed.

A still further object of the invention is to provide means for turning or inverting the meat at desired intervals and to spray the meat with barbecue solution for a predetermined short period of time following each turning operation.

Other objects and advantages of the invention will become apparent as the following description is read on the drawing forming a part of this specification, and in which similar reference characters are used to designate similar parts throughout the several views, of which;

Figures 1, 2:
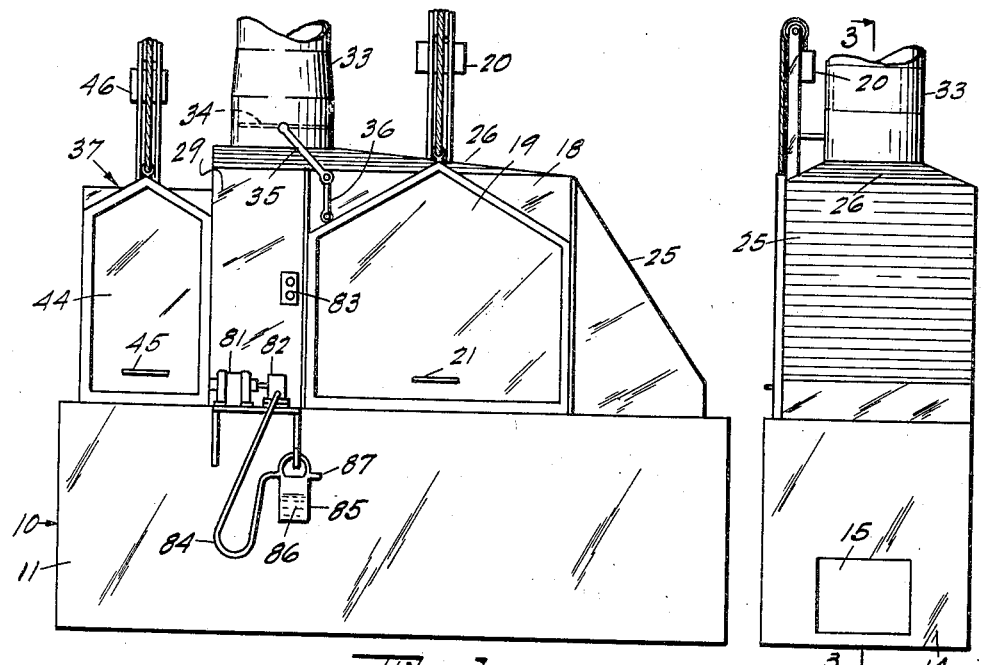
Fig. 1 is a front elevation of the invention.
Fig. 2 is an end elevation of Fig. 1, showing the firing end.

The barbecue solution and method of use is set forth in my copending application, Serial No. 130,084, filed March 10, 1937.

This invention consists of a barbecue furnace comprising a fire pit 10 which may be constructed of any suitable material, such as brick, concrete or steel, and has a front wall 11, rear wall 12, and end walls 13 and 14, the end wall 14 having a suitable stoking or firing opening 15, through which the wood, such as hickory, may be introduced for the fire 17.

The barbecuing oven or smoke chamber consists of a front wall 18 provided with a door 19, which is counterweighted as indicated at 20 and having a handle 21 by which the door may be opened and closed for introducing, hand turning, and removal of the meat 22.

The barbecuing oven also has a rear wall 23 which is continuous throughout the length of the hood which includes the barbecuing oven, stack section, and warming oven; this hood completely enclosing the top of the fire pit 10, and the barbecuing oven and stack section forming one unit, and the warming oven forming a separate unit which is dependent upon the fire pit and on one of the walls of the stack section for heating, this wall being indicated at 24, forming the dividing wall between the stack section and the warming oven.

The fire end of the barbecuing oven has an inclined wall 25 for the purpose of deflecting the smoke and preventing perceptible eddy currents, and continues into the upwardly sloped top wall 26, which extends to the stack section and warming oven wall 24.

A transverse wall 27 divides the hood into a stack portion 29 and the barbecue oven 30, and extends down into the fire pit to form a baffle 31 for the purpose of extending the smoke entrapment chamber to a plane below the meat 22, to form a completely enveloping smoke bath for the meat for entrapment of the smoke 28 which extends into the fire pit substantially to a plane 32.

A stack 33 is provided with a damper 34 which is operated by means of a crank 35, which is suitably connected to the door 19 by a link 36, whereby, when the door 19 is opened, the damper 34 is coincidently opened to permit escape of smoke 28 from the oven 30.

The end wall 24 forms one wall of a warming oven 37 which has a back wall 23 as previously described, a top wall 39, bottom wall 40, another end wall 41, shelves 42 and 43, and a door 44 which has a handle 45 for opening and closing, the door being counterweighted as indicated at 46; this oven being directly heated through the bottom wall 40 and stack wall 24.

A suitable grid or grate 47, such as cast iron open grating or heavy metal screen is used for supporting the meat 22 and forms a divisional wall between the fire pit and oven while permitting the smoke and heat to pass therethrough with minimum restriction.

Figures 3, 4:
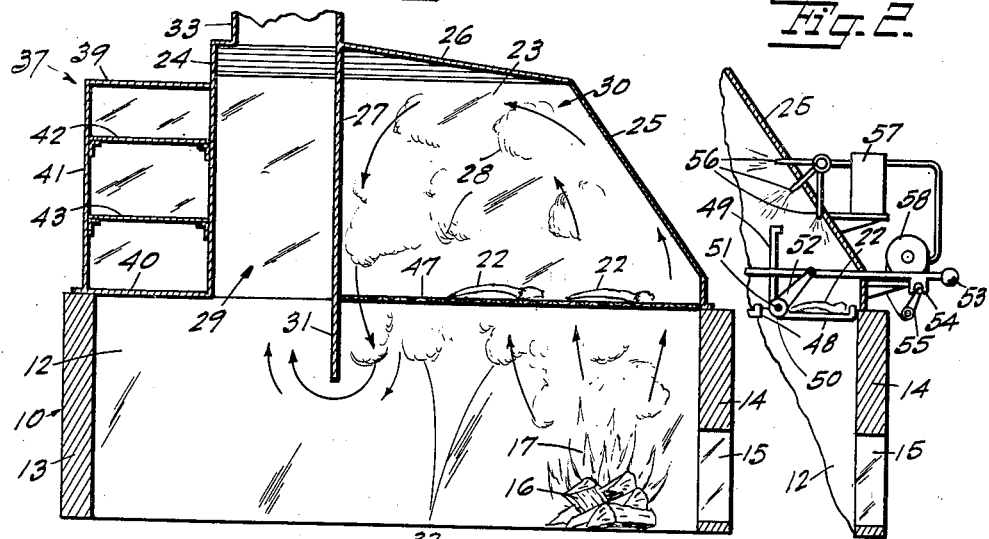
Fig. 3 is a sectional elevation through the invention, and is taken on a line 3—3 of Fig. 2.
Fig. 4 is a fragmentary sectional elevation through one end of the invention, showing a modification with means for turning or inverting the meat, and automatically spraying the meat with solution following each turning operation.
Figure 5:
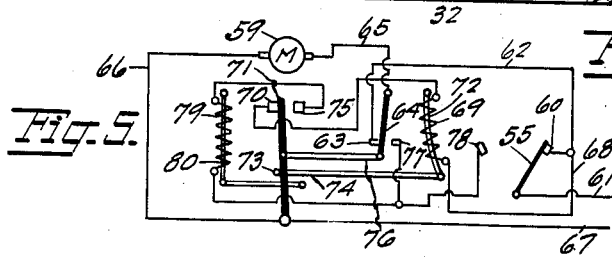
Fig. 5 is a wiring diagram applicable to the automatic spraying of the meat following each turning operation.

In Figs. 4 and 5 is shown an arrangement for automatically spraying the meat 22 with sealing and seasoning solution each time that the meat is turned or inverted.

In this arrangement, the grids are formed of metal and each grid consists of two right-angularly related, connected grid elements 48 and 49 having a common boss 50, the grid being supported by a shaft or pivot 51.

A lever 52 is formed integrally with, or connected to each grid, and a plunger 53 connects all of the levers 52 for simultaneous operation. This plunger 53 is provided with a dog 54, which cooperates with a switch lever 55 for closing electrical circuits in either direction of movement of the plunger 53.

A plurality of spray nozzles 56 project through the walls of the oven, and are all supplied from a source 57 of sealing and seasoning solution, which is sprayed onto the meat by means of a supply of air under pressure from a compressor 58, which is driven by a motor 59, Fig. 5.

The operation of this arrangement is as follows: As the plunger 53 is pulled to the right, it coincidently swings lever 55 to the right, making contact with contact 60, thus completing circuit from main power line 61 through wire 62, contact 63, switch arm 64, wire 65, motor 59, wire 66 to main power line 67. Simultaneously, circuit is completed through wire 68, heating element 69, contact 70, switch arm 71 to wire 67.

As the heating resistance 69 becomes heated, it flexes a bi-metal element 72, and after a predetermined flexing of this element, a lug 73 on rod 74 which is connected to element 72, cooperates with lever 71 moving this lever to break contact with contact 70 and make contact with contact 75.

Coincidently, lever 64, through the link 76, breaks contact with contact 63 and makes contact with contact 77. Thus the circuits are broken to both, motor 59 and heating resistance 69, permitting element 72 to cool and return to its original position without affecting switch arm 71. Thus, the meat is treated or sprayed only for a comparatively short period of time, as required for a predetermined flexing of the bimetal element 72.

When the plunger 53 is pushed back to the left as viewed in Fig. 1, the grids 48—49 swing through an angle of 90° inverting the meat while transferring from grid 48 to 49, lever 55 is moved to contact the contact 78 closing circuit through contact 77 and switch arm 64, wire 65, to motor 59, and coincidently closing circuit to heating resistance 79, causing flexing of bimetal element 80 and reversing levers 64 and 71 after a predetermined period. Thus, each time the plunger 53 is operated for reversing the meat 22, the motor 59 is started and operated for a short period of time to operate the compressor 58 for spraying the meat, and then automatically interrupted.

For hand operation, a motor 81 and compressor 82 are controlled by a manually operated switch 83, the compressed air being supplied through flexible tubing 84 to a spray device 85 having a supply of solution 86 which is supplied through the nozzle 87, the jet being directed by hand onto the meat 22 in oven 30.

The operation of the invention as illustrated in Figs. 1, 2, and 3, is as follows: The door 19 is opened, the opening movement of which opens the damper 34 to permit escape of smoke through the stack and obviate its escape through the door opening. Meat 22 is then placed on the grids 47, switch 83 is closed and the sprayer 85 is hand directed to spray the meat with the sealing and seasoning solution. Switch 83 is then opened and the door closed, the closing movement of which also closes the damper 34 entrapping the smoke 28 from the fire 17 within the confines of the pit and oven, while permitting a gradual escape thereof.

With the damper 34 closed, the smoke and heat travels upwardly as indicated by the arrows and is deflected by the inclined wall 25, passing along the top wall 26, and thence downwardly along the wall 27, eddying, and passing back down through the grids, and about the bottom of the baffle 31 and thence into the stack, as the smoke is constantly displaced by new smoke coming from the fire 17. The smoke during this process completely fills the oven and extends down into the fire pit substantially to a plane 32 below the meat, whereby the meat is continuously exposed to a completely enveloping smoke smudge from the fire 17.

With this specific construction, the grid is located within the bath of smoke, the space substantially from a plane coincident with the bottom of the baffle and extending up to the top wall 26 being densely filled with smoke from the burning of the wood 16, maintaining this smoke all about the meat during the entire time of barbecuing or cooking, and providing an unusually delectable flavor to the meat, and which results are not obtainable in so desirable a degree with an open pit in which the smoke passes directly through the grid and escapes immediately to the atmosphere.

It will be understood that variations in construction and arrangement of parts, and in the method of operation, which variations are consistent with the appended claims may be resorted to, without detracting from the spirit or scope of the invention, or sacrificing any of the advantages thereof.

I claim:

1. A barbecue furnace comprising, a fire pit and a superposed barbecuing oven in direct intercommunication; a grid forming a support for meat and forming a divisional wall between said pit and said oven and forming a passage for heat and smoke therebetween, said oven forming a complete enclosure over said grid for entrapment of smoke and gases from a fire in said fire pit to maintain smoke and gases in continuous enveloping contact with the meat on the grid; and a stack section communicating with said pit beyond one end of said oven and in a plane below said grid, whereby the entrapment of smoke is extended below the plane of the grid.

2. A structure as claimed in claim 1; a door opening and a door therefor for said oven, a damper for said stack section, an operative connection between said door and said damper opening and closing said damper coincidently with opening and closing of said door to prevent escape of smoke through the door opening when the door is opened and to entrap the smoke in said oven when said door is closed.

3. A structure as claimed in claim 1; and spraying means operable at will for spraying said meat with a combined cell sealing and meat seasoning composition.

4. A barbecue furnace comprising; a fire pit; a superposed barbecuing oven and a stack section in direct intercommunication with said fire pit and having a dividing wall extending downwardly into said fire pit; a grid forming a support for meat and forming a divisional wall between said pit and said oven and forming a passage for heat and smoke therebetween, said oven forming a complete enclosure over said grid for entrapment of smoke and gases from a fire in the fire pit to maintain smoke and gases in continuous enveloping contact with the meat on the grid, in conjunction with the downwardly-extending portion of said dividing wall extending the lower level of the entrapped smoke to a plane below the grid.

5. A barbecue furnace comprising, a fire pit and a superposed barbecuing oven in direct intercommunication, said oven having an end wall, a stack wall, and a top wall, said end wall being inclined at an acute angle to the vertical in the direction of the stack wall and continuing into said top wall sloping upwardly to meet said stack wall which is vertically arranged, whereby smoke from a fire in the fire pit is deflected toward said stack wall and travels downwardly along said stack wall for discharge to a stack as it is displaced by freshly formed smoke, a grid forming a support for meat and forming a division between said pit and said oven and forming a passage for heat and smoke therebetween.

6. A structure as claimed in claim 5, said oven forming a complete enclosure over said grid for entrapment of smoke and gases from a fire in said fire pit to maintain smoke and gases in continuous enveloping contact with the meat on the grid, said stack wall extending downwardly into the pit to form a smoke entrapment enclosure extending below said grid.

7. A barbecue furnace comprising, a fire pit, a superposed barbecuing oven and a stack section in direct intercommunication with said fire pit, and with said oven through said fire pit, a foraminous grid between said oven and said fire pit, and a baffle extending downwardly into said fire pit to form a smoke trap extending below said grid.

8. A structure as claimed in claim 1; and a spray device for spraying said meat with cell-sealing and seasoning fluid, and turning means operable at will for turning or inverting said meat.

9. A barbecue furnace comprising, a fire pit and a superposed barbecuing oven in direct intercommunication; a grid forming a support for meat and forming a divisional wall between said pit and said oven and forming a passage for heat and smoke therebetween, said oven forming a complete enclosure over said grid for entrapment of smoke and gases from a fire in said fire pit to maintain smoke and gases in continuous enveloping contact with the meat on the grid; a spraying device for spraying said meat with cell-sealing and seasoning fluid, and turning means for simultaneously turning or inverting all of said meat in said oven at will, and means associated with said turning means operating said spray device coincident with each operation of said turning means, and including means limiting the period of operation of said spray device.

10. In a barbecue furnace having an intercommunicating fire pit and oven, and foraminous meat-supporting means between said fire pit and said oven; a spray device for spraying meat with cell-sealing and seasoning composition; and turning means for simultaneously turning all of the meat in said oven, at will, and means associated with said turning means actuating said spray device coincident with each operation of said turning means, and including means limiting the period of each operation of said spray device.

HENRY J. HIRSCHENFELD.